United States Patent
Knizhnik

(10) Patent No.: US 9,632,201 B2
(45) Date of Patent: Apr. 25, 2017

(54) MULTI-AXIAL ANTENNA AND METHOD FOR USE IN DOWNHOLE TOOLS

(71) Applicant: Halliburton Energy Services, Inc., Houston, TX (US)

(72) Inventor: Sergey Knizhnik, Exton, PA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/811,242

(22) Filed: Jul. 28, 2015

(65) Prior Publication Data

US 2015/0331137 A1  Nov. 19, 2015

Related U.S. Application Data

(62) Division of application No. 13/895,881, filed on May 16, 2013, now Pat. No. 9,121,960, which is a division of application No. 12/095,692, filed as application No. PCT/US2006/036009 on Sep. 15, 2006, now Pat. No. 8,471,562.

(51) Int. Cl.
| | |
|---|---|
| G01V 3/08 | (2006.01) |
| G01V 3/00 | (2006.01) |
| G01V 3/10 | (2006.01) |
| G01V 3/18 | (2006.01) |
| H01Q 1/04 | (2006.01) |
| H01Q 3/26 | (2006.01) |
| H01Q 7/00 | (2006.01) |
| H01Q 25/00 | (2006.01) |
| H01F 5/02 | (2006.01) |

(52) U.S. Cl.
CPC ............... *G01V 3/104* (2013.01); *G01V 3/18* (2013.01); *H01Q 1/04* (2013.01); *H01Q 3/26* (2013.01); *H01Q 7/00* (2013.01); *H01Q 25/00* (2013.01); *H01F 2005/027* (2013.01)

(58) Field of Classification Search
CPC ........................................................ G01V 3/30
USPC ........................................................ 324/346
See application file for complete search history.

(56) References Cited

U.S. PATENT DOCUMENTS

| | | |
|---|---|---|
| 3,092,800 A | 6/1963 | Helias |
| 3,800,213 A | 3/1974 | Rorden |
| 4,063,207 A | 12/1977 | Williams |
| 4,418,570 A | 12/1983 | Warren, Jr. et al. |

(Continued)

FOREIGN PATENT DOCUMENTS

| | | |
|---|---|---|
| CN | 1249436 A | 4/2000 |
| DE | 3735585 A1 | 4/1988 |

(Continued)

OTHER PUBLICATIONS

"U.S. Appl. No. 12/095,692, Final Office Action mailed Mar. 1, 2012", 15 pgs.

(Continued)

*Primary Examiner* — Bot Ledynh
(74) *Attorney, Agent, or Firm* — Gilliam IP PLLC

(57) ABSTRACT

Embodiments of a multi-axial antenna system and system for measuring subsurface formations are generally described herein. Other embodiments may be described and claimed. In some embodiments, the multi-axial antenna system comprising at least two co-located coils wound around a torroidal-shaped bobbin. Each coil generates a magnetic field in a mutually orthogonal direction. Signals provided to the coils may be adjusted to simulate a tilted-coil antenna system.

12 Claims, 6 Drawing Sheets

(56) References Cited

U.S. PATENT DOCUMENTS

| | | | |
|---|---|---|---|
| 4,812,812 A | 3/1989 | Flowerdew et al. |
| 4,834,193 A | 5/1989 | Leitko, Jr. et al. |
| 4,907,658 A | 3/1990 | Stangl et al. |
| 4,945,999 A | 8/1990 | Malzahn |
| 4,958,689 A | 9/1990 | Lee |
| 5,070,948 A | 12/1991 | Malzahn et al. |
| 5,331,271 A | 7/1994 | Thuis |
| 5,390,349 A | 2/1995 | Joshi et al. |
| 5,672,967 A | 9/1997 | Jensen et al. |
| 5,781,160 A | 7/1998 | Walton |
| 6,118,193 A | 9/2000 | Morris |
| 6,166,543 A | 12/2000 | Sezginer et al. |
| 6,181,138 B1 | 1/2001 | Hagiwara et al. |
| 6,366,086 B1 | 4/2002 | Sen |
| 6,459,262 B1 | 10/2002 | Wisler et al. |
| 6,563,474 B2 | 5/2003 | Nantz et al. |
| 7,019,528 B2 | 3/2006 | Bittar |
| 7,038,457 B2 | 5/2006 | Chen et al. |
| 7,295,168 B2 | 11/2007 | Saegusa et al. |
| 8,432,167 B2 | 4/2013 | Reiderman |
| 8,471,562 B2 | 6/2013 | Knizhnik |
| 9,121,960 B2 | 9/2015 | Knizhnik |
| 2003/0184488 A1 | 10/2003 | Smith et al. |
| 2004/0017197 A1 | 1/2004 | Chen et al. |
| 2005/0189945 A1 | 9/2005 | Reiderman |
| 2006/0011385 A1 | 1/2006 | Seydoux et al. |
| 2006/0043973 A1 | 3/2006 | Chen et al. |
| 2008/0030415 A1 | 2/2008 | Homan et al. |
| 2009/0302847 A1 | 12/2009 | Knizhnik |
| 2013/0249561 A1 | 9/2013 | Knizhnik |

FOREIGN PATENT DOCUMENTS

| | | |
|---|---|---|
| EP | 0214897 A1 | 3/1987 |
| EP | 0523025 A1 | 1/1993 |
| EP | 0911484 A2 | 4/1999 |
| GB | 2310500 A | 8/1997 |
| GB | 2343521 A | 5/2000 |
| GB | 2387033 A | 10/2003 |
| JP | 07006919 A | 1/1995 |
| SU | 1377803 A1 | 2/1988 |
| WO | WO-0050926 A1 | 8/2000 |
| WO | WO-03100466 A1 | 12/2003 |
| WO | WO-2004099817 A2 | 11/2004 |
| WO | WO-2008036077 A2 | 3/2008 |
| WO | WO-2008036077 A3 | 3/2008 |

OTHER PUBLICATIONS

"U.S. Appl. No. 12/095,692, Final Office Action mailed Oct. 17, 2012", 6 pgs.
"U.S. Appl. No. 12/095,692, Non Final Office Actiion mailed May 24, 2011", 16 pgs.
"U.S. Appl. No. 12/095,692, Non Final Office Action mailed May 9, 2012", 15 pgs.
"U.S. Appl. No. 12/095,692, Notice of Allowance mailed Feb. 19, 2013", 5 pgs.
"U.S. Appl. No. 12/095,692, Preliminary Amendment filed May 30, 2008", 3 pgs.
"U.S. Appl. No. 12/095,692, Response filed May 1, 2012 to Final Office Action mailed Mar. 1, 2012", 17 pgs.
"U.S. Appl. No. 12/095,692, Response filed Jul. 30, 2012 to Final Office Action mailed May 9, 2012", 17 pgs.
"U.S. Appl. No. 12/095,692, Response filed Aug. 23, 2011 to Non-Final Office Action mailed May 24, 2011", 14 pgs.
"U.S. Appl. No. 12/095,692, Response filed Dec. 6, 2011 to Restriction Requirement mailed Nov. 8, 2011", 11 pgs.
"U.S. Appl. No. 12/095,692, Response filed Dec. 17, 2012 to Final Office Action mailed Oct. 17, 2012", 12 pgs.
"U.S. Appl. No. 12/095,692, Restriction Requirement mailed Nov. 8, 2011", 6 pgs.

"U.S. Appl. No. 13/895,881, Final Office Action mailed May 14, 2014", 9 pgs.
"U.S. Appl. No. 13/895,881, Non Final Office Action mailed Sep. 1, 2004", 8 pgs.
"U.S. Appl. No. 13/895,881, Non Final Office Action mailed Sep. 20, 2013", 8 pgs.
"U.S. Appl. No. 13/895,881, Notice of Allowance mailed Apr. 29, 2015", 6 pgs.
"U.S. Appl. No. 13/895,881, Response filed Feb. 19, 2015 to Non Final Office Action mailed Sep. 19, 2014", 9 pgs.
"U.S. Appl. No. 13/895,881, Response filed Jul. 14, 2014 to Final Office Action mailed May 14, 2014", 9 pgs.
"U.S. Appl. No. 13/895,881, Response filed Sep. 11, 2013 to Restriction Requirement mailed Jul. 11, 2013", 5 pgs.
"U.S. Appl. No. 13/895,881, Respponse filed Feb. 20, 2014 to Non Final Office Action mailed Sep. 20, 2013", 7 pgs.
"U.S. Appl. No. 13/895,881, Restriction Requirement mailed Jul. 11, 2013", 6 pgs.
"Chinese Application Serial No. 200680055829.5, Office Action mailed Sep. 21, 2011", (w/ English Translation), 17 pgs.
"Chinese Application Serial No. 200680055829.5, Response filed Jan. 12, 2012 to Office Action mailed Oct. 17, 2011", (w/ English Translation of Amended Claims), 16 pgs.
"Chinese Application Serial No. 201210393434.3, Office Action mailed May 6, 2015", 8 pgs.
"Chinese Application Serial No. 201210393434.3, Office Action mailed Sep. 16, 2014", (w/ English Translation), 16 pgs.
"Chinese Application Serial No. 201210393434.3, Response filed Jan. 19, 2015 to Office Action mailed Sep. 16, 2014", (w/ English Claims), 18 pgs.
"European Application Serial No. 06803663.1, Communication mailed Apr. 16, 2010", 8 pgs.
"European Application Serial No. 14181867.4, Extended European Search Report mailed Dec. 12, 2014", 9 pgs.
"International Application Serial No. PCT/US2006/036009, International Search Report mailed Jul. 21, 2008", 5 pgs.
"International Application Serial No. PCT/US2006/036009, Written Opinion mailed Jul. 21, 2008", 9 pgs.
Kriegshauser, B., et al., "A New Multicomponent Induction Logging Tool to Resolve Anisotropic Formations", SPWLA 41st Annual Logging Symposium, (Jun. 4-7, 2000), 1-14.
Suzuki, "Abstract of JP07006919A".
"Chinese Application Serial No. 201210393434,3, Response filed Jul. 17, 2015 to Office Action mailed May 6, 2015", (w/ English Translation of Amended Claims), 18 pgs.
"European Application Serial No. 06803663.1, Extended European Search Report mailed Apr. 16, 2010", 8 pgs.
"European Application Serial No. 06803663.1, Minuites of the Oral Proceedings mailed Jan. 28, 2014", 5 pgs.
"European Application Serial No. 06803663.1, Office Action mailed Jan. 29, 2013", 5 pgs.
"European Application Serial No. 06803663.1, Office Action mailed Aug. 1, 2011", 7 pgs.
"European Application Serial No. 06803663.1, Reply filed Dec. 16, 2011 to Office Action mailed Aug. 1, 2011", 15 pgs.
"European Application Serial No. 06803663.1, Response filed Jul. 19, 2013 to Office Action mailed Jan. 29, 2013", 11 pgs.
"European Application Serial No. 06803663.1, Response filed Jul. 30, 2013 to Office Action mailed Jan. 29, 2013", 14 pgs.
"European Application Serial No. 06803663.1, Response filed Dec. 9, 2010 to Extended European Search Report mailed Apr. 16, 2010", 11 pgs.
"European Application Serial No. 06803663.1, Result of Consultation mailed Jan. 7, 2014", 3 pgs.
"European Application Serial No. 06803663.1, Summons to Attend Oral Proceedings mailed Aug. 20, 2013", 6 pgs.
"European Application Serial No. 06803663.1, Written Submissions filed Jan. 7, 2014 in response to Consultation with Examiner on Dec. 20, 2013", 21 pgs.
"European Application Serial No. 06803663.1, Written Submissions filed Dec. 16, 2013 in response to Summons mailed Aug. 20, 2013", 58 pgs.

(56) References Cited

OTHER PUBLICATIONS

"European Application Serial No. 14181867.4, Office Action mailed Jan. 19, 2015", 2 pgs.
"European Application Serial No. 14181867.4, Response filed Jul. 10, 2015 to Office Action mailed Jan. 19, 2015", 18 pgs.
"International Application Serial No. PCT/US2006/036009, Letter under Article 19(1) filed Sep. 12, 2008 in response to Written Opinion mailed Jul. 21, 2008", 8 pgs.
"Chinese Application Serial No. 201210393434.3, Office Action mailed Feb. 25, 2016", 15 pgs.
"Chinese Application Serial No. 201210393434.3, Office Action mailed Oct. 26, 2015", (w/ English Translation), 17 pgs.

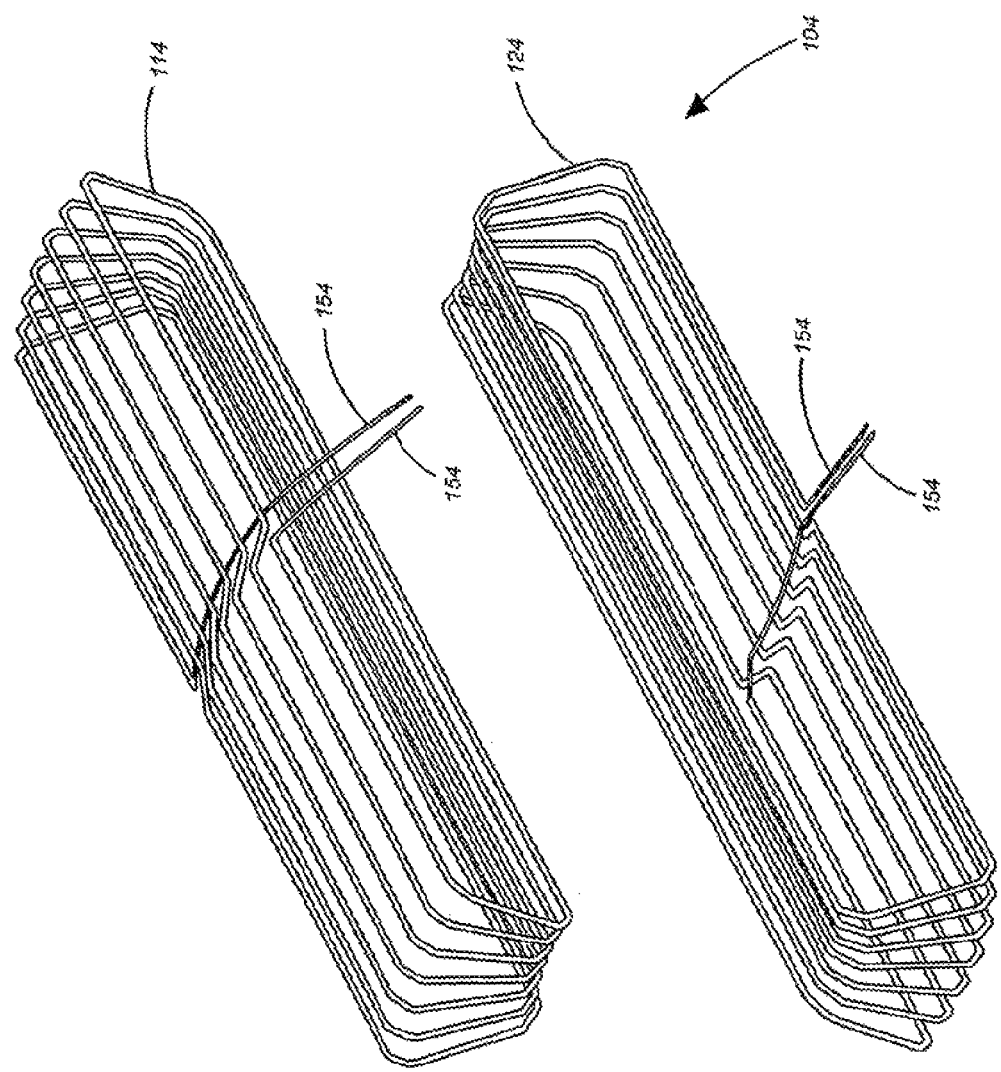

MULTI-AXIAL ANTENNA AND METHOD FOR USE IN DOWNHOLE TOOLS

RELATED APPLICATIONS

This application is a Divisional application of U.S. patent application Ser. No. 13/895,881, filed May 16, 2013, which is a Divisional application of U.S. patent application Ser. No. 12/095,692, filed Feb. 6, 2009, which, application is a U.S. National Stage Filing under 35 U.S.C. 371 from International Application Number PCT/US2006/036009, filed Sep. 15, 2006 and published in English as WO 2008/036077 A2 on Mar. 27, 2008, which applications and publication are incorporated herein by reference in their entirety.

TECHNICAL FIELD

The present invention relate to antenna systems and electromagnetic sensors. Some embodiments relate to the measurement of subsurface formations. Some embodiments relate to measurement while drilling (MWD) operations.

BACKGROUND

Electromagnetic sensors are often used in downhole operations, including while drilling, to measure the physical properties of subsurface formations. Many of these electromagnetic sensors use one or more coils to generate magnetic fields. These sensors, for example, include so-called induction, propagation, and nuclear-magnetic resonance (NMR) tools, which may use one or more coils that operate as antennas to generate and/or receive magnetic fields. Often, in order to achieve the desired performance, these tools carry groups of coils with their magnetic vectors oriented in different directions. One problem with these conventional tools is that their bodies are often made from conductive material (e.g., metal), which makes it difficult for the coils to be positioned to perform in an optimal fashion. Another problem with these conventional tools is that the coils are different sizes requiring a separate calibration for the size and position of each coil. This makes it difficult to accurately tune and calibrate the coil system as a whole.

Thus, what are needed are electromagnetic sensors with improved coil performance. What are also needed are electromagnetic sensors with improved performance when the coils are located on conductive bodies. What are also needed are co-located antennas for use on downhole tools that are easier to tune and calibrate.

BRIEF DESCRIPTION OF THE DRAWINGS

FIG. 2E illustrates a perspective view of sections of a coil of a multi-axial antenna system in accordance with some embodiments of the present invention;

DETAILED DESCRIPTION

The following description and the drawings sufficiently illustrate specific embodiments of the invention to enable those skilled in the art to practice them. Other embodiments may incorporate structural, logical, electrical, process, and other changes. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
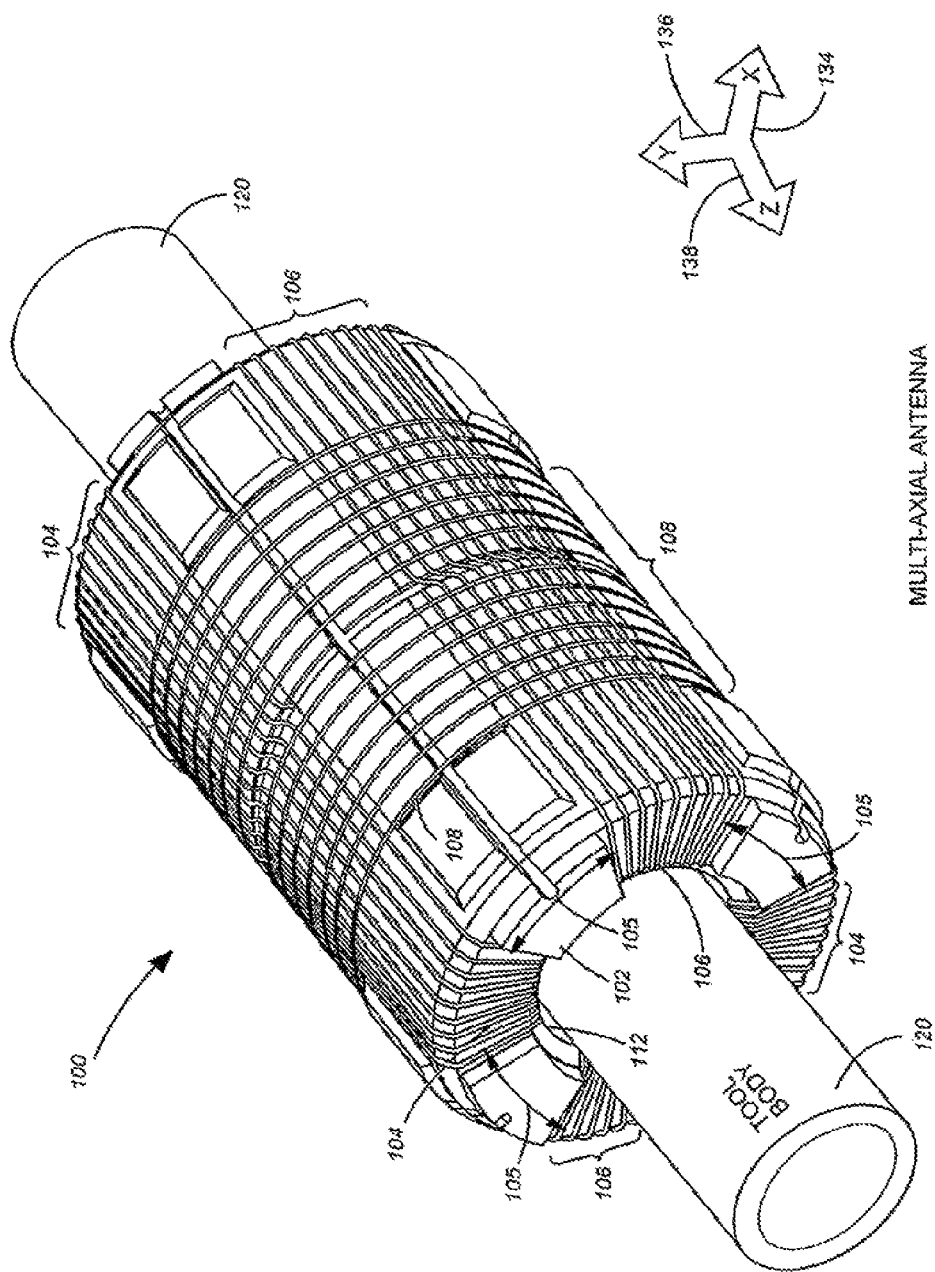
FIG. 1 illustrates a multi-axial antenna system in accordance with some embodiments of the present invention.

FIG. 1 illustrates a multi-axial antenna system in accordance with some embodiments of the present invention. Multi-axial antenna system 100 comprises at least two co-located coils wound around torroidal-shaped bobbin 102. Each coil may generate a magnetic field in a mutually orthogonal direction. In some embodiments, multi-axial antenna system 100 may comprise first coil 104 wound around a portion of bobbin 102 through central recess 112 of bobbin 102 to generate a magnetic field in substantially first direction 134 when current flows through first coil 104. Multi-axial antenna system 100 may also comprise second coil 106 wound around a second portion of bobbin 102 through central recess 112 to generate a magnetic field in substantially second direction 136 when current flows through second coil 106. Second direction 136 may be orthogonal to first direction 134.

In some embodiments, multi-axial antenna system 100 may also comprise third coil 108 wound longitudinally around bobbin 102 to generate a magnetic field in substantially third direction 138 when current flows through third coil 108. Third direction 138 may be orthogonal to first direction 134 and second direction 136.

In some embodiments, any mutual inductance between coils 104, 106 & 108 may be significantly reduced and may even approach zero due to the orthogonal positioning of each of coils 104, 106 & 108, although the scope of the invention is not limited in this respect. In some embodiments, first direction 134 may be the x-direction, second direction 136 may be the y-direction, and third direction 138 may be the z-direction as shown, although the scope of the invention is not limited in this respect. In these embodiments, first coil 104 and second coil 106 may comprise sets of frame-shaped turns and third coil 108 may comprise a solenoid. These embodiments are described in more detail below.

In some embodiments, multi-axial antenna system 100 may be used to transmit magnetic fields in different directions, while in other embodiments, multi-axial antenna system 100 may be used to receive magnetic fields from the different directions. In some embodiments, one or more multi-axial antenna systems similar to multi-axial antenna system 100 may be used for transmitting magnetic fields and one or more other multi-axial antenna systems similar to multi-axial antenna system 100 may be used to sense return magnetic fields that are generated by the transmitting antenna(s), although the scope of the invention is not limited in this respect. In some other embodiments, multi-axial antenna system 100 may be used for both the transmission and reception of magnetic fields, although the scope of the invention is not limited in this respect.

In some embodiments, antenna system 100 may be suitable for use as an electromagnetic sensor. In some embodiments, antenna system 100 may be utilized as part of a logging tool, such as a multi-component induction tool, a propagation tool, or a nuclear magnetic resonance (NMR) sensor, although the scope of the invention is not limited in this respect. In some of these embodiments, antenna system 100 may be utilized during Measurement-While-Drilling (MWD) operations, Logging-While-Drilling (LWD) operations, or wireline operations, although the scope of the invention is not limited in these respects.

In some of these embodiments, central recess 112 may be substantially circular to receive tool body 120 of a downhole tool. Tool body 120 may comprise metal or other conductive material. First and second directions 134 & 136 may be orthogonal to a tool axis which may run parallel to third direction 138. In these embodiments, first and second directions 134 & 136 may be transverse with respect to the axis of bobbin 102.

In some embodiments, first coil 104 may be positioned on bobbin 102 at approximately ninety-degrees with respect to second coil 106, and first and second coils 104 & 106 may be spaced apart by central angle 105 on bobbin 102 as illustrated. Third coil 108 may be wound longitudinally around bobbin 102 to provide three co-located antennas. In some embodiments, third coil 108 may be wound first on bobbin 102, and coils 104 & 106 may be wound secondly around coil 108, although the scope of the invention is not limited in this respect. In some embodiments, bobbin 102 may be keyed to prevent antenna system 100 from rotating or sliding with respect to tool body 120, although the scope of the invention is not limited in this respect.

In some alternate embodiments, bobbin 102 may carry first and second coils 104 & 106, while a separate external bobbin may carry third coil 108, although the scope of the invention is not limited in this respect. In the embodiments, the axial position of the two bobbins may be adjusted and fixed independently to provide independent tuning for the coils on each bobbin. When first and second coils 104 & 106 are the same size, separate tuning coils 104 & 106 may not be required.

Figure 2A:
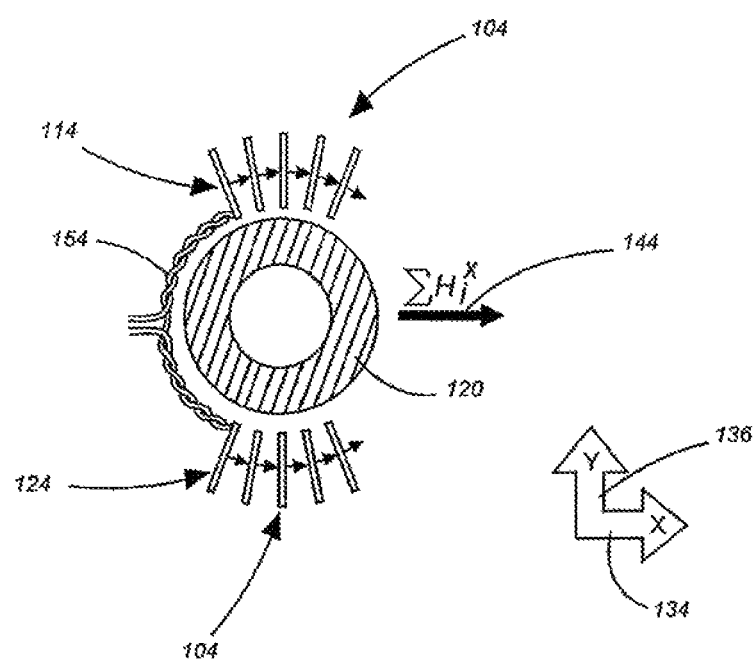
FIG. 2A is a functional view of a first coil and a tool body in accordance with some embodiments of the present invention.
Figure 2B:
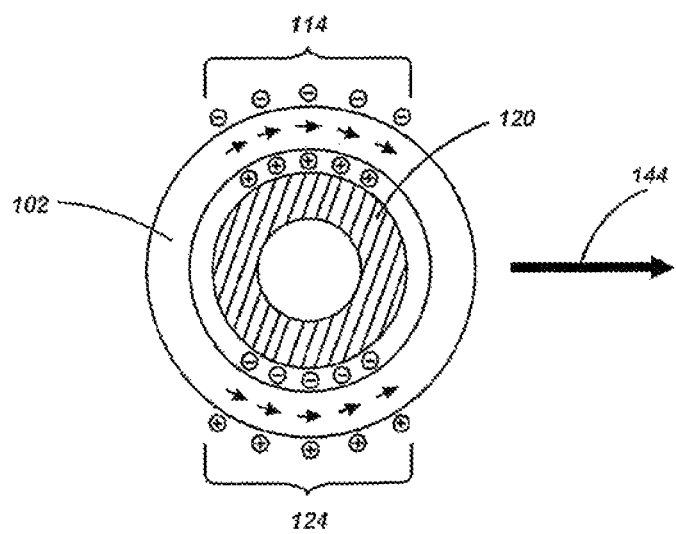
FIG. 2B illustrates a cross-sectional view of a first coil, a bobbin and a tool body in accordance with some embodiments of the present invention.

FIG. 2A is a functional view of a first coil and a tool body in accordance with some embodiments of the present invention. FIG. 2B illustrates a cross-sectional view of a first coil, a bobbin and a tool body in accordance with some embodiments of the present invention. As illustrated in FIGS. 2A & 2B, first coil 104 may comprise first and second sections 114 & 124. First and second sections 114 & 124 may be wound and connected in such a way that current flowing through sections 114 & 124 generate combined magnetic field 144 substantially in direction 134. In some embodiments, first and second sections 114 & 124 may be wound in opposite directions to generate combined magnetic field 144 substantially in direction 134, although the scope of the invention is not limited in this respect. In other embodiments, first and second sections 114 & 124 may be wound in the same direction and current may be provided in opposite directions to generate combined magnetic field 144 substantially in direction 134, although the scope of the invention is not limited in this respect. Coil 104 is formed by a plurality of loops, which may generate a magnetic moment that is substantially normal to the plane of the loops (i.e., in direction 134 of magnetic field 144). For clarity, bobbin 102 is not illustrated in FIG. 2A.

Figure 2C:
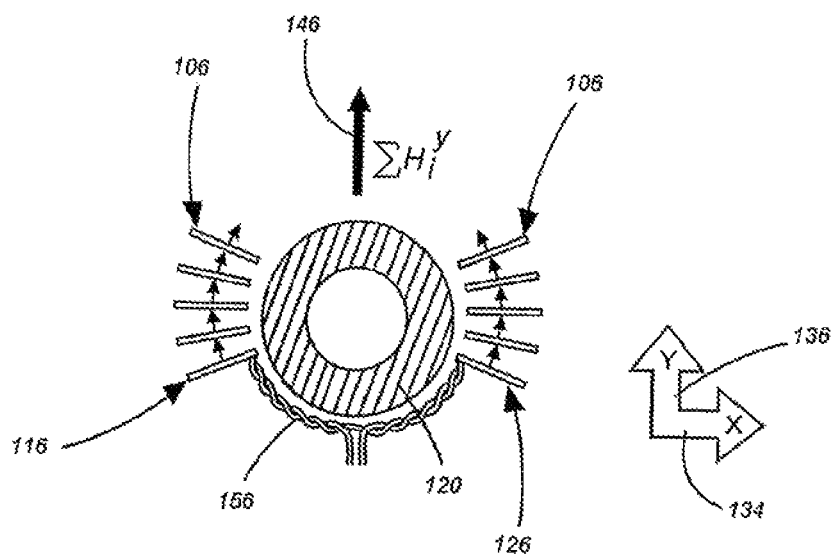
FIG. 2C is a functional view of a second coil and a tool body in accordance with some embodiments of the present invention.
Figure 2D:
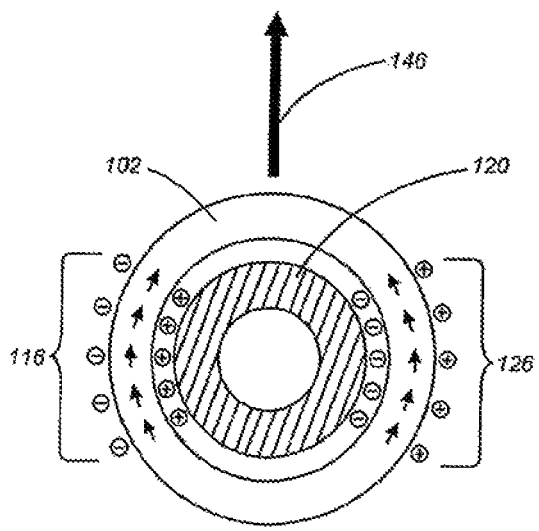
FIG. 2D illustrates a cross-sectional view of a second coil, a bobbin and a tool body in accordance with some embodiments of the present invention.

FIG. 2C is a functional view of a second coil and a tool body in accordance with some embodiments of the present invention. FIG. 2D illustrates a cross-sectional view of a second coil, a bobbin and a tool body in accordance with some embodiments of the present invention As illustrated in FIGS. 2C & 2D, second coil 106 may comprise third and fourth sections 116 & 126. Third and fourth sections 116 & 126 may be wound and connected in such a way that current flowing through sections 116 & 126 generate combined magnetic field 146 substantially in direction 136. In some embodiments, third and fourth sections 116 & 126 may be wound in opposite directions to generate combined magnetic field 146 substantially in direction 136, although the scope of the invention is not limited in this respect. In other embodiments, third and fourth sections 116 & 126 may be wound in the same direction and current may be provided in opposite directions to generate combined magnetic field 146 substantially in direction 136, although the scope of the invention is not limited in this respect. Coil 106 is formed by a plurality of loops, which may generate a magnetic moment that is substantially normal to the plane of the loops (i.e., in direction 136 of magnetic field 146). For clarity, bobbin 102 is not illustrated in FIG. 2C.

Referring to FIGS. 1 and 2A through 2D together, in some embodiments, multi-axial antenna system 100 may also comprise first thru-wires 154 to electrically couple the first and second sections 114 & 124 of first coil 104. In these embodiments, multi-axial antenna system may also include second thru-wires 156 to electrically couple third and fourth sections 116 & 126 of second coil 106. In some embodiments, first thru-wires 154 may be twisted to form a twisted pair minimizing external magnetic fields. In some embodiments, second thru-wires 156 may also be twisted to form a twisted pair minimizing external magnetic fields. In some embodiments, the twisted pairs may be run through grooves in bobbin 102, discussed in more detail below.

In some embodiments, first thru-wires 154 may couple first and second sections 114 & 124 in series, and second thru-wires 156 may couple third and fourth sections 116 & 126 in series, although the scope of the invention is not limited in this respect. In some alternate embodiments, first thru-wires 154 may couple first and second sections 114 & 124 in parallel, and second thru-wires 156 may couple third and fourth sections 116 & 126 in parallel, although other combinations are also suitable.

In some embodiments, first and second coils 104 & 106 may be substantially identical in size and shape and may be co-located in substantially the same longitudal position (i.e., with respect to tool body 120), although the scope of the invention is not limited in this respect. In these embodiments, the origins of the magnetic moments of first and second coils 104 & 106 may be in the same position making the tuning and the calibration of first and second coils 104 & 106 simpler and quicker to accomplish.

In some embodiments, bobbin 102 may comprise an electrically non-conductive and/or insulating material. In some embodiments, bobbin 102 may comprise a ceramic material, fiberglass, a thermoplastic such as poly-ether-ether-ketone (PEEK), as well as other plastics, although other non-conductive materials may also be suitable.

In some embodiments, antenna system 100 may be protected by a housing or sleeve (not illustrated) that may be substantially transparent to radio-frequency signals. The housing or sleeve may comprise fiberglass or a thermoplastic although other materials may also be suitable. In some alternate embodiments, coils 104, 106 & 108 of antenna system 100 may be potted in a non-conductive material, such as rubber or epoxy, inside the housing or sleeve, although the scope of the invention is not limited in this respect. In some downhole embodiments, the housing or sleeve may be pressure balanced to compensate for pressure in a borehole, although the scope of the invention is not limited in this respect.

In some embodiments, bobbin 102 may have a high-permeability ($\mu_r$) core such as ferrite, although the scope of the invention is not limited in this respect. The permeability of the core may range from one to up to several thousands. Unlike conventional torroidal coils, due to the direction of the windings and/or the current through coils 104 & 106, little or no magnetic flux circulates within the core.

In some embodiments, the phase and/or amplitude of currents provided to first, second and third coils 104, 106 & 108 may be varied to generate magnetic fields, respectively, in the first, second and third directions 134, 136 & 138. In these embodiments, antenna system 100 may be able to simulate a fixed tilted-coil antenna system used in downhole operations, although the scope of the invention is not limited in this respect. In some of these embodiments, each coil 104, 106 & 108 may operate at the same frequency or set of frequencies, although the scope of the invention is not limited in this respect. In some of these tilted coil embodiments, a magnetic field may be generated and/or sensed in a direction that can be represented as three orthogonal vectors, collinear with and transverse to an axis of a LWD tool. In these embodiments, when the LWD tool rotates and advances into a formation, the entire volume in the vicinity to a borehole may be scanned by multi-axial antenna system 100. In some cases with conventional tilted-coil systems, the LWD tool may advance into or out of a formation without rotation (e.g., sliding while a mud motor is active) and/or the LWD tool's rotation may be too slow to conduct adequate scanning of the surrounding medium. In such cases, conventional tilted-coil systems become less efficient. To help overcome these limitations of conventional tilted-coil systems in sliding modes, multi-axial antenna system 100 may perform a virtual rotation of the magnetic field by driving coils 104, 106 & 108 with phase-shifted signals. In these embodiments, the currents in coils 104, 106 & 108 may be varied and/or the phases may be shifted to generate a rotational magnetic field, although the scope of the invention is not limited in this respect.

In some embodiments, signals may be provided to the first, second and third coils 104, 106 & 108 in a time-shifted manner. In these embodiments, the coils 104, 106 & 108 may be driven one at a time, although the scope of the invention is not limited in this respect.

In some embodiments, coils 104, 106 & 108 may comprise turns of wire. In other embodiments, coils 104, 106 & 108 may be fabricated by depositing metal traces on the surface of bobbin 102. In some other embodiments, coils 104, 106 & 108 may be fabricated by etching a conductive layer deposited on the surface of bobbin 102, although the scope of the invention is not limited in this respect.

In some embodiments, the turns of coils 104 and/or 106 may be connected in parallel, while in other embodiments, the turns may be connected in series. In yet other embodiments, a combination of parallel and series connections may be used. In some embodiments, when the antenna system 100 is part of a receiving antenna system, the turns of first coil 104 may be connected in series and the turns of second coil 106 may also be connected in series. In some embodiments, when the antenna system 100 is part of a transmitting antenna system, at least some of the turns of first coil 104 may be connected in parallel and at least some of the turns of second coil 106 may be connected in parallel. In some embodiments, particularly when antenna system 100 is part of a transmitting antenna system, the number of turns of the first and second coils 104 & 106 that are connected in parallel may be selected to match an output impedance of a signal generator or transmitter, although the scope of the invention is not limited in this respect.

FIG. 2E illustrates a perspective view of sections of a coil of a multi-axial antenna system in accordance with some embodiments of the present invention. As illustrated in FIG. 2E, coil 104 may comprise section 114 and section 124. Thru-wires 154 may electrically couple first and second sections 114 & 124 of first coil 104. For clarity, bobbin 102 is not illustrated in FIG. 2E.

Except for their positioning on bobbin 102, sections 116 & 126 of coil 106 may be substantially similar and possibly even identical to first and second sections 114 & 124 of coil 104 illustrated in FIG. 2E. As described above, thru-wires 154 may connect sections 114 & 124 in either a series or parallel configuration to generate a magnetic field in the same direction (i.e., direction 134 for coil 104).

Figure 2F:
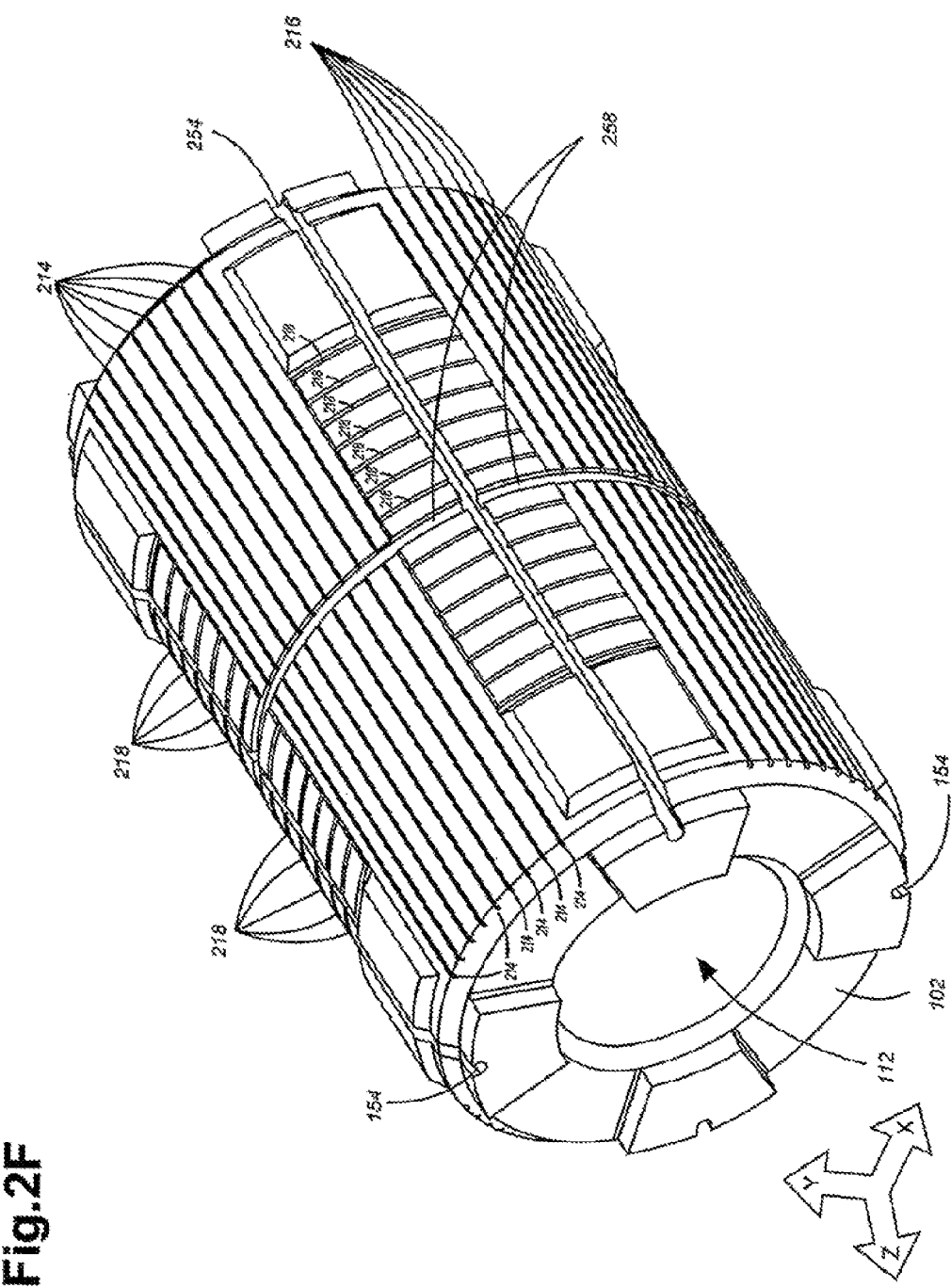
FIG. 2F illustrates a perspective view of a bobbin suitable for use in a multi-axial antenna system in accordance with some embodiments of the present invention.

FIG. 2F illustrates a perspective view of a bobbin suitable for use in a multi-axial antenna system in accordance with some embodiments of the present invention. In these embodiments, bobbin 102 may be a single element and may include longitudal grooves 214 to accept the turns of section 114 (FIG. 2B) of first coil 104 (FIG. 1), longitudal grooves 216 to accept turns of section 116 (FIG. 2D) of second coil 106 (FIG. 1), and circumferential grooves 218 to accept turns of third coil 108 (FIG. 1), although the scope of the invention is not limited in this respect. The use of the various grooves may allow the coils to be wound more accurately, which may provide additional dimensional stability to the coils under different environmental conditions, such as temperature, pressure and vibration.

In some embodiments, bobbin 102 may also comprise thru-wire grooves 254 & 258 to allow the passage of thru wires 154 (FIG. 2E) between the sections of coils 104 & 106 (FIG. 1). Thru-wire grooves 254 & 258 may be deeper than longitudal grooves 214 & 216 and/or circumferential grooves 218 as illustrated, although the scope of the invention is not limited in this respect. In some embodiments, grooves 214, 216, 218, 254 & 258 may be milled on the surface of bobbin 102, although the scope of the invention is not limited in this respect.

Bobbin 102 may allow coils 104, 106 & 108 to be co-located and to be wound without any spatial interference between their windings. Furthermore, the co-location of coils 104, 106 & 108 allows the origin of each coil's magnetic moment to be located at substantially the same spot. Recess 112 of bobbin 102 may comprise an empty space suitable for a screen to help prevent the electromagnetic fields generated by coils 104, 106 & 108 from penetrating tool body 120.

Figure 3:
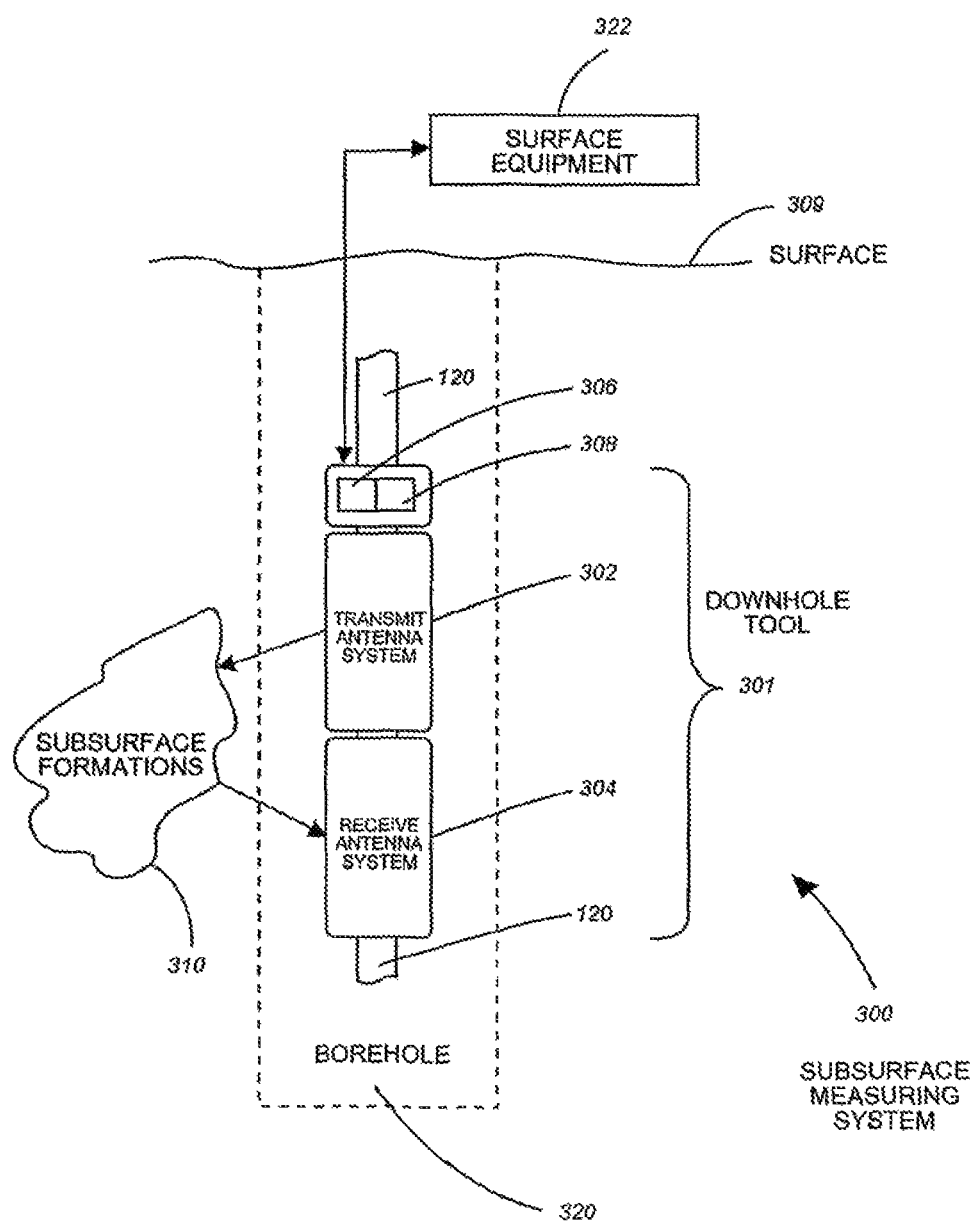
FIG. 3 is a functional block diagram of a subsurface measuring system for measuring subsurface formations in accordance with some embodiments of the present invention.

FIG. 3 is a functional block diagram of a subsurface measuring system for measuring subsurface formations in accordance with some embodiments of the present invention. Subsurface measuring system 300 may be used for measuring subsurface formations 310 below surface 309. Subsurface measuring system 300 may comprise downhole tool 301 and surface equipment 322. Downhole tool 301 may include transmitting antenna 302, receiving antenna 304, signal-generating circuitry 306 and system controller 308. Transmitting antenna system 302 may comprise at least two co-located coils wound around a torroidal-shaped bobbin. Signal generating circuitry 306 may provide signals to the coils of transmitting antenna system 302 to generate magnetic fields in mutually orthogonal directions. In some embodiments, a multi-axial antenna system, such as multi-axial antenna system 100 (FIG. 1) may be suitable for use as transmitting antenna system 302 and/or receiving antenna system 304, although the scope of the invention is not limited in this respect. In these embodiments that employ separate antenna systems for transmitting and receiving, the transmitting and receiving antenna systems 302 & 304 may be located on adjacent portions of tool body 120 as illustrated in FIG. 3, although this is not a requirement.

In some embodiments, signal-generating circuitry 306 may provide currents with varying amplitudes and/or phases to the coils of transmitting antenna system 302 to generate magnetic vectors in angled directions to simulate a tilted-coil antenna system. In some other embodiments, signal-generating circuitry 306 may provide signals with shifted phases to the coils of transmitting antenna system 302 to generate a rotational magnetic field, although the scope of the invention not limited in this respect. During downhole operations, downhole tool 301 may be located on tool body 120 within borehole 320.

In some embodiments, transmitting antenna system 302 generates magnetic fields for incident on subsurface formations 310 and receiving antenna system 304 may receive return magnetic fields from subsurface formations 310. In these embodiments, system controller 308 may process the return magnetic fields and may further provide control signals to signal-generating circuitry 306 for controlling the generation of incident magnetic fields by transmitting antenna system 302.

In some embodiments, transmitting antenna system 302 may comprise first and second transmitting antenna coils. At least some of the turns of the first transmitting antenna coil may be connected in parallel and at least some of the turns of the second transmitting antenna coil may also be connected in parallel, although the scope of the invention not limited in this respect. In these embodiments, receiving antenna system 304 may also comprise first and second receiving antenna coils. The turns of the first receiving antenna coil may be connected in series and the turns of the second receiving antenna coil may also be connected in series, although the scope of the invention not limited in this respect.

Although subsurface measuring system 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), and combinations of various hardware and logic circuitry for performing at least the functions described herein. In some embodiments, the functional elements of subsurface measuring system 300 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A subsurface measuring system for measuring subsurface formations comprising:
    an antenna system comprising first, second, and third co-located coils positioned around a toroidal-shaped bobbin; and
    signal generating circuitry to provide signals to the coils to generate magnetic fields in mutually orthogonal directions, wherein the toroidal-shaped bobbin comprises an electrically non-conductive material,
        wherein the first coil comprises first and second opposite coil sections positioned around first opposite portions of the bobbin to generate a magnetic field in substantially a first direction, the first and second coil sections being electrically coupled in parallel by first thru-wires that extend transversely through the first and second coil sections respectively and that are connected together to form a twisted pair, and
        wherein the second coil comprises third and fourth opposite coil sections positioned around second opposite portions of the bobbin to generate a magnetic field in substantially a second direction, the third and fourth opposite coil sections being electrically coupled in parallel by second thru-wires that extend transversely through the third and fourth coil sections respectively and that are connected together to form a twisted pair.

2. The measuring system of claim 1, wherein the first coil is positioned on the bobbin at approximately ninety-degrees with respect to the second coil, wherein the first and second coils are spaced apart on the bobbin, and wherein the third coil is wound around the bobbin transverse to the first and second coils, the third coil overlapping the first and second portions of the bobbin to provide three co-located antennas.

3. The measuring system of claim 1, further comprising signal-generating circuitry to vary signals to the first, second, and third coils to generate a rotational magnetic field.

4. The measuring system of claim 3, wherein the signal-generating circuitry provides signals to the first, second and third coils in a time-shifted manner.

5. The measuring system of claim 1, wherein the antenna system is a transmitting antenna system to generate magnetic fields for incidence on subsurface formations, and wherein the system further comprises a receiving antenna system to receive return magnetic fields from the subsurface formations.

6. The measuring system of claim 5, wherein the transmitting antenna system comprises first and second transmitting antenna coils, and wherein the receiving antenna system comprises first and second receiving antenna coils, turns of the first receiving antenna coil being connected in series and turns of the second receiving antenna coil being connected in series.

7. The measuring system of claim 1, wherein the bobbin includes a plurality of grooves to accept windings of the coils.

8. A subsurface measuring system for measuring subsurface formations comprising:
- an antenna system comprising first, second, and third co-located coils positioned around a toroidal-shaped bobbin; and
- signal generating circuitry to provide signals to the coils to generate magnetic fields in mutually orthogonal directions, wherein the toroidal-shaped bobbin comprises an electrically non-conductive material,
  - wherein the first coil comprises opposite coil sections positioned around first opposite portions of the bobbin to generate a magnetic field in substantially a first direction, the system further comprising first thru-wires that extend transversely through the first and second coil sections respectively, the first thru-wires forming a twisted pair that electrically couples the opposite coil sections of the first coil in parallel,
  - wherein the second coil comprises opposite coil sections positioned around second opposite portions of the bobbin to generate a magnetic field in substantially a second direction, the system further comprising second thru-wires that extend transversely through the third and fourth coil sections respectively, the second thru-wires forming a twisted pair that electrically couples the opposite coil sections of the second coil in parallel, and
  - wherein the bobbin includes a plurality of grooves to accept windings of the coils.

9. The measuring system of claim 8, wherein the first coil is positioned on the bobbin at approximately ninety-degrees with respect to the second coil, wherein the first and second coils are spaced apart on the bobbin, and wherein the third coil is wound around the bobbin transverse to the first and second coils, the third coil overlapping the first and second portions of the bobbin to provide three co-located antennas.

10. The measuring system of claim 8, further comprising signal-generating circuitry to vary signals to the first, second, and third coils to generate a rotational magnetic field.

11. The measuring system of claim 8, wherein the antenna system is a transmitting antenna system to generate magnetic fields for incidence on subsurface formations, and wherein the system further comprises a receiving antenna system to receive return magnetic fields from the subsurface formations.

12. The measuring system of claim 8, wherein the receiving antenna system comprises first and second receiving antenna coils, turns of the first receiving antenna coil being connected in series and turns of the second receiving antenna coil being connected in series.

* * * * *